United States Patent [19]

Pinson

[11] Patent Number: 4,577,825
[45] Date of Patent: Mar. 25, 1986

[54] OCULAR POINTING AND TRACKING DEVICE

[75] Inventor: George T. Pinson, Huntsville, Ala.

[73] Assignee: The Boeing Company, Seattle, Wash.

[21] Appl. No.: 522,604

[22] Filed: Aug. 12, 1983

[51] Int. Cl.[4] .................... F16M 11/12; F16M 13/00
[52] U.S. Cl. .................................. 248/550; 248/183; 343/765
[58] Field of Search ............... 343/765, 766, 882, 880; 248/124, 183, 179, 481, 550, 178, 181; 74/89.22, 507, 501 M

[56] References Cited

U.S. PATENT DOCUMENTS

| 2,762,234 | 9/1956 | Dodd | 343/765 X |
| 3,046,840 | 7/1962 | Barcus | 74/501 M X |
| 3,933,058 | 1/1976 | Kraine | 74/501 M |
| 3,987,452 | 10/1976 | Godet | 343/765 |

Primary Examiner—Ramon S. Britts
Assistant Examiner—Karen Chotkowski
Attorney, Agent, or Firm—Edwin H. Crabtree

[57] ABSTRACT

An ocular pointing and tracking device for complete hemispherical scan capability. The device may be used for receiving a sensor at a target and making necessary corrections for relative target motion.

5 Claims, 5 Drawing Figures

OCULAR POINTING AND TRACKING DEVICE

BACKGROUND OF THE INVENTION

This invention relates to a device for mounting a target sensor thereon and more particularly but not by way of limitation to an ocular pointing and tracking device for pointing and searching an area for a target located at an unknown point.

Heretofore, mechanical pointing and tracking devices have used primarily a multi-gimbaled sensor platform. Servo motors are used to drive each of the gimbals to align the sensor with a target. This type of system requires the servos to be driven by a controller that generates a preplan sequel of commands or generate necessary commands based on feedback information. The disadvantages of this type of system are caused by the necessity to have precisely calibrated electrical torquers to maintain knowledge of sensor direction and position use of multiple precision bearings and the complexity of the controller to determine fractional motion by each servo. The most significant disadvantage of this type system is the component size required to support the sensor, the required precision of the device and its associated cost, weight and complexity.

Other prior art devices have used an azimuth/elevation mount as used in a typical radar system. Variations of this type of mount are used in NASA Deep Space Tracking and Communications networks and Polar Mounts used typically in astronomical telescopes and similar related type of work. The disadvantages of these types of systems is primarily the requirement for at least one of the pointer and tracker resolvers to be mounted using a gimbal. Again this type of system requires the use of precision gearing with anti-backlash provisions. Further this type of system is bulky and expensive.

Heretofore, there have been various types of tracking antenna devices and platforms as described in the following United States Patents: U.S. Pat. No. 2,654,031 to Mullins, Jr. et al., U.S. Pat. No. 2,667,578 to Barnett et al., U.S. Pat. No. 2,786,361 to Russell, U.S. Pat. No. 2,762,234 to Dodd, U.S. Pat. No. 3,987,452 to Godet, U.S. Pat. No. 4,238,802 to Speicher, U.S. Pat. No. 4,282,529 to Speicher and U.S. Pat. No. 4,304,381 to Lloyd. None of these prior art patents specifically describe the unique features and advantages of the subject invention as described herein.

SUMMARY OF THE INVENTION

The subject ocular pointing and tracking device provides a low-cost, mechanical pointing and tracking platform which does not require gimbals and a sensor may be quickly attached for use in searching an area for a target located at some unknown point.

The pointing and tracking device with the sensor platform is used for pointing the sensor at a target and correcting for relative target motion. The pointing and tracking device is able to search the target area in a preprogrammed manner.

Also, when a target is located, the device is capable of maintaining the sensor in a line of sight on the target to the degree of accuracy required to compensate for either target or sensor platform motion.

The ocular pointing and tracking device for complete hemispherical scan includes a movable sensor platform adapted for receiving a sensor and the like thereon. The sensor platform is mounted on a socket which allow complete rotating motion in a X-Y plane. The sensor platform is connected to a X axis drive belt and a Y axis drive belt with the belt connected to a X axis drive motor and Y axis drive motor for rotating the platform around a X and Y axis.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
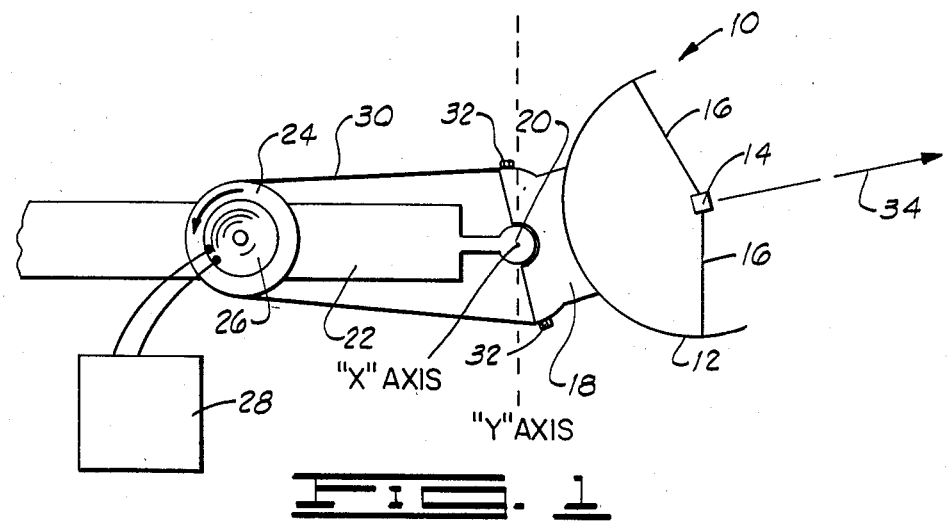
FIG. 1 is a side view of the ocular pointing and tracking device with the platform rotated about an X axis upwardly.

In FIG. 1 the ocular pointer and tracking device is designated by general reference numeral 10. The device 10 includes a conical shaped sensor platform 12 adapted for receiving a sensor 14 supported thereon by support arms 16. The sensor 14 may be an antenna, mirror or any other type of device used for tracking and sensing a target.

The platform 12 is rotatably mounted on a socket housing 18 attached to a center ball joint 20. The ball joint 20 is stationary mounted on a support structure 2. Attached to the support structure 22 is a pulley 24 connected to a drive motor 26 which is controlled by stop and start commands from a motor controller 28. It should be noted in this Fig. the socket housing 18 and platform 12 are rotated about an X axis through the center of the ball joint 20. The platform 12 is rotated upwardly as shown in FIG. 1 by rotating the pulley 24 in a counterclockwise direction which in turn rotates a cable 30 attached thereto at attachment points 32 on opposite ends of the platform 12.

Figure 2:
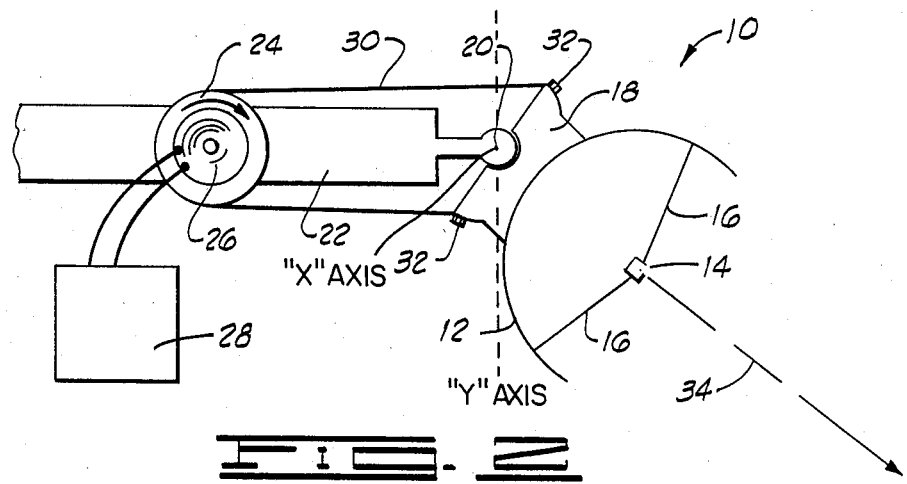
FIG. 2 is similar to FIG. 1 with the platform moved downwardly about the horizontal X axis.

In FIG. 2 the motor controller 28 has given the motor 26 a command to lower the platform 12 thereby rotating the pulley 24 in a clockwise manner and lowering a line of sight illustrated by dash line 34.

From reviewing FIGS. 1 and 2 it can be seen the ocular pointing and tracking device 10 does not require precision bearings or any other precision component of any type and can be fabricated for example, using low cost injection molding techniques out of suitable lightweight plastic or composite materials such as used in construction of fiberglass or carbon filament molded structures.

The required sensor 14 can either be fabricated as part of the sensor platform 12 or attached to the sensor platform 12. The sensor 14 as shown is merely illustrating a typical application.

While the use of the cable 30 and pulley 24 driven by a motor 26 is shown to provide motion of the platform 12 this same motion can be achieved by many different types of motion drivers.

Figure 3:
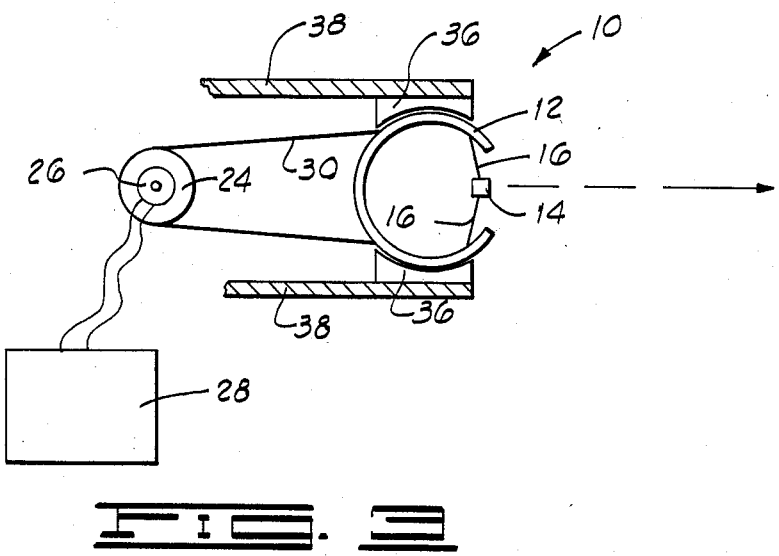
FIG. 3 illustrates an alternate embodiment with the platform received around a ball joint attached to a missile skin or mounting support.

In FIG. 3 an alternate embodiment of the device 10 is shown wherein the movable platform 12 is received in a ball socket 36 attached to a missile skin or support 38. This alternate design does not differ substantially from the device as shown in FIGS. 1 and 2 and it should be noted that two motors and drive cables at 90 degrees to each other would be required to provide full range of motion along with a second motor controller for providing stop and start commands.

Figure 4:
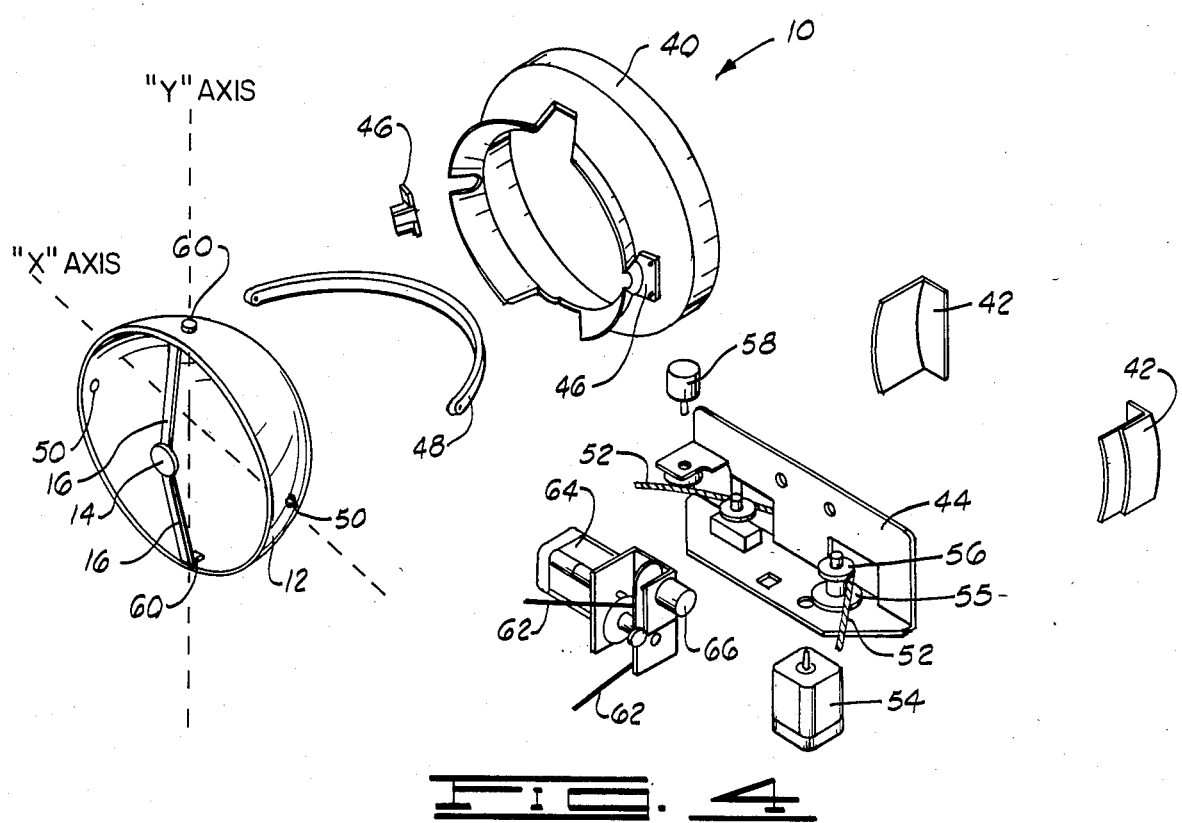
FIG. 4 illustrates an exploded view of the ocular pointing and tracking device.

In FIG. 4 a more detailed illustration of the ocular pointing and tracking device 10 is shown wherein the conical shaped platform 12 is rotatably mounted on a socket 40. The socket 40 is attached to support brackets 42 which are secured to a support beam 44. The socket 40 is attached to a pair of guide channels 46 which slidably receive a drive chain guide 48. The ends of the guide 48 are attached to the sides of the platform 12 at attachment points 50. Also connected at the attachment points 50 are the ends of a Y axis drive belt 52 which is driven by a Y axis drive motor 54 mounted on the support beam 44. The Y axis drive motor 54 drives a drive pulley 55 which in turn drives a driven gear 56 which engages the drive belt 52. The drive belt 52 also engages a Y axis position sensing potentiometer 58 which is used to measure the movement around the Y axis of the platform 12.

Figure 5:
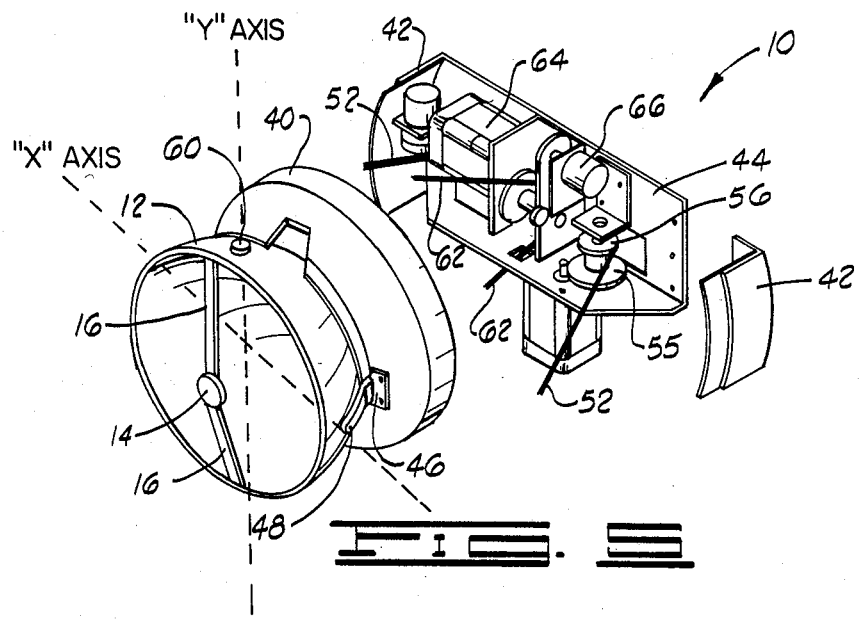
FIG. 5 illustrates a partially assembled view of the ocular pointing and tracking device shown in FIG. 4.

The platform 12 also includes X axis drive belt attachment points 60 at the top and bottom thereof for receiving the ends of a X axis drive belt 62 which is driven by a X axis drive motor 64. The motor 64 is also attached to the support beam 44. A X axis position sensing potentiometer 66 also engages the X axis drive belt 62 for determining the motion of the platform 12 when it moves around the horizontal X axis. FIG. 5 shows the device 10 partially assembled except for securing the socket 40 to the brackets 42 and connecting the belts 52 and 62 to the attachment points on the platform 12.

From reviewing the above drawings it can be seen that the ocular pointing and tracking device 10 is similar to the human eye and provides complete freedom for rotating in an X-Y plane for locating and searching target areas using various types of sensors mounted and centered on the movable sensor platform 12.

Changes may be made in the construction and arrangement of the parts or elements of the embodiments as described herein without departing from the spirit or scope of the invention defined in the following claims.

What is claimed is:

1. An ocular pointing and tracking device for complete hemispherical scan, the device comprising:
   a movable sensor platform adapted for receiving a sensor and the like in the front thereof, the platform conical in shape;
   a socket for receiving a portion of the conical sensor platform thereon, the platform rotatably mounted in the socket, the socket attached to a pair of guide channels for slidably receiving a drive guide, the ends of the guide attached to the sides of the platform;
   a Y axis drive motor having an Y axis drive belt connected to the ends of the drive guide for rotating the platform around a vertical Y axis;
   a Y axis position sensing potentiometer connected to the Y axis drive motor for sensing the movement of the platform around the vertical Y axis;
   a X axis drive motor having a X axis drive belt connected to the platform for rotating the platform around a horizontal X axis; and
   a X axis position sensing potentiometer connected to the X axis drive motor for sensing the movement of the platform around the horizontal X axis.

2. The device as described in claim 1 further including a first motor controller connected to the X axis drive motor for issuing start and stop commands in controlling the X axis drive motor.

3. The device as described in claim 1 further including a second motor controller connected to the Y axis drive motor for issuing start and stop commands in controlling the Y axis drive motor.

4. The device as described in claim 1 wherein the socket is attached to support brackets secured to a support beam, the X axis and Y axis drive motors mounted on the support beam.

5. An ocular pointing and tracking device for complete hemispherical scan, the device comprising:
   a movable sensor platform adapted for receiving a sensor and the like in the front thereof, the platform conical in shape;
   a socket for receiving a portion of the conical sensor platform thereon, the platform rotatably mounted in the socket, the socket attached to support brackets secured to a support beam, the socket further attached to a pair of guide channels for slidably receiving a drive guide, the ends of the guide attached to the sides of the platform;
   a Y axis drive motor having Y axis drive belt connected to the ends of the drive guide for rotating the platform around a vertical Y axis, the Y axis drive motor mounted on the support beam;
   a Y axis position sensing potentiometer connected to the Y axis drive motor for sensing the movement of the platform around the vertical Y axis;
   a X axis drive motor having X axis drive belt connected to the platform for rotating the platform around a horizontal X axis, the X axis drive motor mounted on the support beam; and
   a X axis position sensing potentiometer connected to the X axis drive motor for sensing the movement of the platform around the horizontal X axis.

* * * * *